United States Patent
Gingerich et al.

(10) Patent No.: US 6,562,260 B2
(45) Date of Patent: May 13, 2003

(54) RECOVERY OF ELECTROLUMINESCSENT PHOSPHOR FROM ENCAPSULATED MATERIAL

(75) Inventors: Richard G. W. Gingerich, Towanda, PA (US); Chen-Wen Fan, Sayre, PA (US); Keith A. Klindinst, Hudson, MA (US)

(73) Assignee: Osram Sylvania Inc., Danvers, MA (US)

( * ) Notice: Subject to any disclaimer, the term of this patent is extended or adjusted under 35 U.S.C. 154(b) by 93 days.

(21) Appl. No.: 09/963,963

(22) Filed: Sep. 26, 2001

(65) Prior Publication Data

US 2003/0057399 A1 Mar. 27, 2003

Related U.S. Application Data

(60) Provisional application No. 60/256,278, filed on Dec. 18, 2000.

(51) Int. Cl.$^7$ ............................................. C09K 11/02
(52) U.S. Cl. .................. 252/301.4 R; 252/301.4 F; 252/301.4 P; 252/301.4 H; 252/301.4 S; 252/301.5; 252/301.6 R; 252/301.6 S; 252/301.6 P; 252/301.6 F
(58) Field of Search ................... 252/301.4 R, 301.4 S, 252/301.4 P, 301.4 F, 301.4 H, 301.5, 301.6 R, 301.6 S, 301.6 P, 301.6 F

(56) References Cited

U.S. PATENT DOCUMENTS

| 5,330,791 | A | * | 7/1994 | Aihara et al. | ................ 427/215 |
| 5,403,403 | A | * | 4/1995 | Lee | .............................. 134/42 |
| 6,042,748 | A | * | 3/2000 | Inoue et al. | .......... 252/301.4 S |
| 6,064,150 | A | | 5/2000 | Klinedinst et al. | .......... 313/503 |

FOREIGN PATENT DOCUMENTS

JP          1-294789        * 11/1989

* cited by examiner

Primary Examiner—C. Melissa Koslow
(74) Attorney, Agent, or Firm—William H. McNeill

(57) ABSTRACT

A method of recovering a base phosphor from encapsulated phosphors, which comprises the steps of selecting a recovery vessel including a magnetic stir bar; adding to the recovery vessel, deionized water, a first batch of concentrated hydrochloric acid and encapsulated phosphor to form a stirred suspension; heating the stirred suspension to about 90° C. for about 2 hours; settling the stirred suspension; decanting the mother liquor and slurrying the remaining solids with a second batch of hydrochloric acid and water; decanting and washing the remaining solids with deionized water; filtering the remaining solids to form a filter cake; heating the filter cake at 110° C. in air for a time sufficient to form a dried filter cake; and screening the dried filter cake through a −325 mesh screen to yield a recovered base phosphor.

4 Claims, No Drawings

RECOVERY OF ELECTROLUMINESCSENT PHOSPHOR FROM ENCAPSULATED MATERIAL

This application claims priority from Provisional Patent Application No. 60/256,276, filed Dec. 18, 2000.

TECHNICAL FIELD

This invention relates to electroluminescent phosphors and more particularly to such phosphors encapsulated with a life-extending coating. Still more particularly, it relates to a method of recovering the base electroluminescent phosphors from such encapsulated materials.

BACKGROUND ART

Phosphors are a known class of materials that emit electromagnetic radiation, usually in the visible region of the spectrum, upon excitation by another form of energy. Phosphors are usually named for the type of energy to which they susceptible. For example, cathodoluminescent phosphors are excited to emission by impingement of electrons or cathode rays; photoluminescent phosphors are excited to emission by impingement of actinic radiation; x-ray phosphors by the impingement of x-rays; and electroluminescent phosphors by the action of an electric field, usually supplied by an alternating current. It is with the latter type of phosphor that this invention is most particularly concerned.

Commercial electroluminescent phosphors are mostly based upon a host material of zinc sulfide activated by one or more activators among which are copper and/or manganese and/or chloride, which are incorporated into the host structure. These phosphors have uses as lamps or illuminating sources for readout devices or watch faces. Two basic kinds are employed, one in which the phosphor is dispersed in an organic binder and laminated in plastic, and a second variety in which the phosphor is dispersed in a ceramic dielectric and fused to a metal plate.

The plastic variety is the more economical; however, the light output of the phosphor encased in an economical plastic such as Mylar™ degrades rapidly, such phosphors having a half-life of about 50 hours at operation at 400 Hz and 100 volts. (The half-life of a phosphor is that point in time when its light output is reduced by half from some initial light output). Incorporation of the phosphor in a more expensive plastic lamina such as Aclar™ will produce a lamp having much better life (for example, a half-life of 500 to 2000 hours at operating levels of 400 Hz and 100 volts) with, however, a concomitant increase in the cost of the lamp.

To further increase the life of the electroluminescent phosphors it is known to encapsulate individual phosphor particles with a continuous, conformal dielectric, moisture-inhibiting material that allows the use of the phosphor in the less expensive plastic materials. For example, U.S. Pat. No. 6,064,150 teaches an electroluminescent phosphor having thereon a coating of aluminum nitride or aluminum nitride amine. Other coatings have included aluminum oxide hydroxide. An instance of the latter is disclosed in Ser. No. 09/153,978, filed Sep. 16, 1998, now abandoned, and assigned to the assignee of this invention.

It would be an advance in the art if a method could be provided for recovering a base electroluminescent phosphor from an encapsulated material.

DISCLOSURE OF INVENTION

It is, therefore, an object of the invention to provide a method of recovering a base phosphor from an encapsulated one.

It is another object of the invention to provide an economical process for recovery.

These objects are accomplished, in one aspect of the invention, by a method of recovering a base phosphor from encapsulated phosphors, which comprises the steps of selecting a recovery vessel including a magnetic stir bar; adding to the recovery vessel, deionized water, a first batch of concentrated hydrochloric acid and encapsulated phosphor to form a stirred suspension; heating the stirred suspension to about 90° C. for about 2 hours; settling the stirred suspension; decanting the mother liquor and slurrying the remaining solids with a second batch of hydrochloric acid and water; decanting and washing the remaining solids with deionized water; filtering the remaining solids to form a filter cake; heating the filter cake at 110° C. in air for a time sufficient to form a dried filter cake; and screening the dried filter cake through a −325 mesh screen to yield a recovered base phosphor.

The process is economical and yields a base phosphor with good performance characteristics.

BEST MODE FOR CARRYING OUT THE INVENTION

For a better understanding of the present invention, together with other and further objects, advantages and capabilities thereof; reference is made to the following disclosure and appended claims.

Base phosphors were recovered from encapsulated phosphors coated by two different processes leading to coatings of two different materials. The first material is designated in Tables I and II as ANE. This material is a zinc sulfide-based electroluminescent phosphor coated with aluminum nitride amine by the process disclosed in the above-cited U.S. Pat. No. 6,064,150. The second material is designated in Table III as TNE. This material also is a zinc sulfide-based electroluminescent phosphor, coated, however, with aluminum oxide hydroxide by the process disclosed in the above-cited co-pending application, Ser. No. 09/153,978.

EXAMPLES

To a 600 ml beaker equipped with a 2.5 inch 0.5 inch magnetic stir bar the following materials are successively added: 92 ml of deionized water; 8 ml of concentrated hydrochloric acid (36% by weight); and 20.01 gm of encapsulated electroluminescent phosphor (Lot 34740-77, Table I)

The resultant suspension was stirred and heated to about 90° C. over a two hour period. After heating the suspension was allowed to settle for about 5 minutes and the mother liquid was decanted. Next, the digested solids were slurried, settled and decanted with, consecutively, 100 ml of 1 M hydrochloric acid and 3 portions of 100 ml deionized water. The material from the final water wash was filtered on a Buchner Funnel on Whatman 42 filter paper. The thus formed filter cake was dried in air in an oven at 110° C. for 3 hours and screened through a −325 mesh stainless steel screen. The result was 16.75 gm of base phosphor. The physical, chemical and optical properties are shown in Table I as Lot No. 34757-8, recovered EL. It will be seen from Table I that the aluminum and nitrogen removal were virtually complete

TABLE I

| Lot No. | Description | % Al | $O_2$ ppm | % $N_2$ | Color X | Color Y | 24 hr Ft. L. | ½ Life Hrs | Eff. Lm/w |
|---|---|---|---|---|---|---|---|---|---|
| HB728-60A | Base EL[1] | — | 1200 | <0.0001 | 0.188 | 0.469 | 32.4 | 1052 | 1.75 |
| 34740-77 | ANE[2] | 3.3 | 2000 | 2.4 | 0.193 | 0.485 | 25.8 | 1838 | 7.16 |
| 34757-8 | Rec. EL[1] | <0.001 | 340 | <0.0001 | 0.191 | 0.464 | 32.9 | 939 | 2.93 |

A second example utilizing a second batch of a similar ANE phosphor is shown in Table II with similar results and a third example utilizing a TNE coated phosphor (aluminum oxide) is shown in Table III. In each instance, the coating material is removed and the base phosphor salvaged.

TABLE II

| Lot No. | Description | % Al | $O_2$ ppm | % $N_2$ | Color X | Color Y | 24 hr Ft. L. | ½ Life Hrs | Eff. Lm/w |
|---|---|---|---|---|---|---|---|---|---|
| H728X106 | Base EL[1] | — | 1500 | <0.0001 | 0.191 | 0.482 | 33.6 | 1007 | — |
| 34740-35 | ANE[2] | 3.6 | 7300 | 2.1 | 0.194 | 0.505 | 22.1 | 2002 | 6.50 |
| 34757-9 | Rec. EL[1] | <0.001 | 1000 | 0.0011 | 0.199 | 0.488 | 31.6 | 1668 | 2.65 |

TABLE III

| Lot No. | Description | % Al | $O_2$ ppm | % $N_2$ | Color X | Color Y | 24 hr Ft. L. | ½ Life Hrs | Eff. Lm/w |
|---|---|---|---|---|---|---|---|---|---|
| ELB-762 | Base EL[1] | — | 1900 | 0.0010 | 0.183 | 0.397 | 32.0 | 737 | 2.14 |
| EL-190 | TNE[2] | 1.5 | 15000 | 0.0150 | 0.184 | 0.409 | 20.9 | 35.6 | — |
| 34763-5 | Rec. EL[1] | <0.001 | 640 | 0.0014 | 0.184 | 0.394 | 31.2 | 771 | 2.62 |

In the Tables, the superscripts shown in the "Description: column indicate the material used in the tested lamps. The superscript 1 indicates phosphors tested in lamps using Aclar™ and the superscript 2 indicates phosphors tested in lamps using Mylar™.

There is thus provided a method for recovering a base phosphor from an encapsulated one.

While there have been shown and described what are at present considered to be the preferred embodiments of the invention, it will be apparent to those skilled in the art that various changes and modification can be made herein without departing from the scope of the invention as defined by the appended claims.

What is claimed is:

1. A method of recovering a base phosphor from encapsulated phosphors comprising the steps of:

selecting a recovery vessel including a magnetic stir bar;

adding to said recovery vessel, deionized water, a first batch of concentrated hydrochloric acid and encapsulated phosphor to form a stirred suspension;

heating said stirred suspension to about 90° C. for about 2 hours;

settling said stirred suspension;

decanting the mother liquor and slurrying the remaining solids with a second batch of hydrochloric acid and water;

decanting and washing the remaining solids with deionized water;

filtering the remaining solids to form a filter cake;

heating said filter cake at 110° C. in air for a time sufficient to form a dried filter cake;

and screening said dried filter cake through a −325 mesh screen to yield a recovered base phosphor.

2. The method of claim 1 wherein said first batch of concentrated hydrochloric acid is 36 percent by weight.

3. The method of claim 2 wherein said second batch of hydrochloric acid is 1 molar.

4. The method of claim 3 wherein said time sufficient to form said dried filter cake is about three hours.

* * * * *